United States Patent [19]
Mejia et al.

[11] Patent Number: 5,952,935
[45] Date of Patent: Sep. 14, 1999

[54] PROGRAMMABLE CHANNEL SEARCH READER

[75] Inventors: E. Zeke Mejia, Longueuil, Canada; Ian Griffiths, Newak, United Kingdom

[73] Assignee: Destron-Fearing Corporation, South St. Paul, Minn.

[21] Appl. No.: 08/735,763

[22] Filed: Oct. 23, 1996

Related U.S. Application Data

[60] Provisional application No. 60/016,808, May 3, 1996.

[51] Int. Cl.$^6$ .............................. G01S 13/00; G08B 21/00
[52] U.S. Cl. ................................ 340/825.54; 340/825.35; 340/825.49; 340/505; 342/42
[58] Field of Search ........................ 340/825.54, 825.35, 340/505, 568, 572, 573, 825.49; 342/42, 51

[56] References Cited

U.S. PATENT DOCUMENTS

| | | | |
|---|---|---|---|
| 5,451,958 | 9/1995 | Schuermann | 342/42 |
| 5,519,381 | 5/1996 | Marsh et al. | 340/572 |
| 5,521,602 | 5/1996 | Carroll et al. | 342/50 |

*Primary Examiner*—William A. Cuchlinski, Jr.
*Assistant Examiner*—Yonel Beaulieu
*Attorney, Agent, or Firm*—Stroock & Stroock & Lavan LLP

[57] ABSTRACT

An interrogator for use with a plurality of identification systems using different frequencies and different methods of demodulation and decoding is provided. Each of the identification systems includes at least one transponder adapted to attached to an article to be identified and each transponder includes an antenna for receiving an interrogation signal from the interrogator and for responding to the received interrogation signal with a responsive signal. The responsive signal includes at least an identification portion. The interrogator includes an antenna assembly for transmitting the interrogation signal from the interrogator to the transponder and receiving the responsive signal from the transponders. A processor is provided for processing the responsive signal received by the antenna assembly and creating an output signal substantially corresponding to the identification portion of the responsive signal. A display is provided for displaying the output signal. A programmable version of the interrogator is also provided as well as a method of using the interrogator to read a plurality of identification systems.

21 Claims, 7 Drawing Sheets

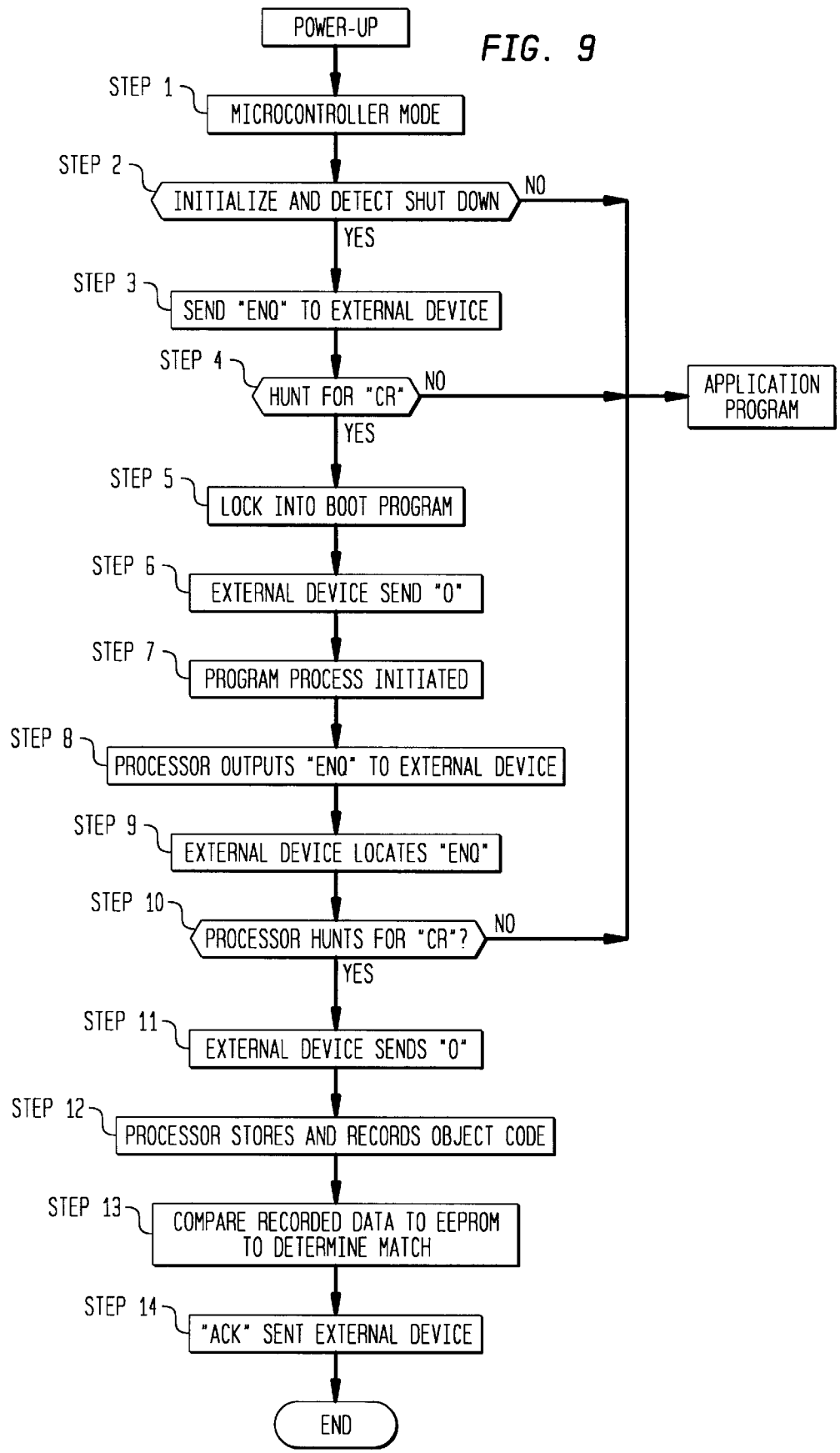

PROGRAMMABLE CHANNEL SEARCH READER

CROSS-REFERENCE NOTATION

This application claims the benefit of U.S. Provisional Application No. 60/016,808, filed May 3, 1996.

BACKGROUND OF THE INVENTION

This invention relates generally to a multichannel reader for interrogating transponders, and in particular, to a programmable channel search reader or multi-channel reader, which is constructed and arranged to interrogate passive transponders which use different methods of modulation and encoding and different frequencies for their respective communication signals.

Historically, readers and transponders were unique unto themselves. That is, a transponder manufactured by company A could only be read by a reader (transceiver) manufactured by company A. However, as the use of transponders in animals, and more specifically, in pets, became more successful in the marketplace, numerous logistical problems were created as a result of the existence of the different transponders from different manufacturers.

More specifically, different veterinarians were implanting different transponders into pets depending on numerous factors including price, reliability, speed and the like. In this manner, if a pet was lost, a pound or shelter, who found the animal, could read the transponder only with the appropriate transceiver to determine its rightful owner. As a result, numerous transceivers were required to determine the identification of the pet. This process was time consuming and expensive.

Based on this problem, the International Organization for Standards ("ISO") proposed a set of standards for the radio identification of animals ("RFID"), i.e. standards for communication between transponders and transceivers. In its proposed rules, the ISO suggests that a new transceiver be developed that could read all types of transponders and in particular, those within its defined operating range. The ISO flier suggests that a transceiver be developed that accommodates a receiver for each of the respective transponder technologies. Based thereon, a transceiver capable of reading each of the different technologies would be available. Although such a system was never built, such a system would have failed in the marketplace for the following reasons.

First, it would be large in size because it would require a separate receiver for each transponder technology. Second, it would process the information slowly due to the fact that it needed to be read by the different receivers. Third, it would be inflexible because it would be difficult to modify and enhance. That is, it would be difficult to add and subtract different receivers depending on which transponders are used in the particular area of the country or the world. Fourth, it would require a complex antenna arrangement, which would create unnecessary interference among the different antennas.

Accordingly, it is desirable to provide a portable multichannel reader, which automatically searches for the appropriate channel, is programmable, is capable of reading all types of transponder technologies, is fast-processing and is small in size.

SUMMARY OF THE INVENTION

Generally speaking, in accordance with the invention, an interrogator is provided for use with a plurality of identification systems using different frequencies and different methods of modulation and encoding. Each of the identification systems include at least one transponder adapted to attach to an article to be identified. Each transponder includes means for receiving an interrogation signal from the interrogator and for responding to the received interrogation signals with a responsive signal. The responsive signal includes at least an identification portion. The interrogator comprises an antenna assembly for transmitting the interrogation signal from the interrogator to the transponder and for receiving the responsive signal from the transponder. A processor is provided for processing the responsive signal received by the antenna assembly and creating an output signal substantially corresponding to the identification portion of the responsive signal. A display is provided for displaying the output signal.

Further, a method is provided for using an interrogator which interrogates a plurality of identification systems using different frequencies and different methods of modulation and encoding. Each of the identification systems includes at least one transponder adapted to attach to an article to be identified. Each transponder comprises means for receiving an interrogation signal from the interrogator and for responding to the received signal with a responsive signal. The responsive signal includes at least an identification portion. The method includes the step of transmitting an interrogation signal from an antenna assembly of the interrogator to the transponder. Next, an antenna assembly receives the responsive signal from the transponder. The responsive signal is processed and an output signal is created substantially corresponding to the identification portion of the responsive signal. Thereafter, the output signal is displayed on a display screen of the interrogator.

A programmable interrogator is also provided for use with a plurality of identification systems using different frequencies and different methods of modulation and encoding. Each of the identification systems includes at least one transponder adapted to attach to an article to be identified. Each transponder comprises means for receiving an interrogation signal from the interrogator and for responding to the received interrogation signal with a responsive signal. The responsive signal includes at least an identification portion. The interrogator comprises an antenna assembly for transmitting the interrogation signal from the interrogator to the transponder and for receiving the responsive signal from the transponder. A processor is provided for processing the signal received by the antenna assembly and creating an output signal substantially corresponding to the identification portion of the responsive signal. A programmer is provided and is connected to the processor for determining the specific types of responsive signals of the transponders of the different identification systems to process.

Accordingly, an object of the invention is to provide an improved portable multichannel reader.

Another object of the invention is to provide a multi-channel reader which automatically searches for the appropriate channel.

Yet another object of the invention is to provide a multi-channel reader which is programmable.

Yet it is still another object of the invention to provide a multi-channel reader capable of reading all types of transponder technologies.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 9 is a flow chart for programming the channel search reader in accordance with the invention.

DETAILED DESCRIPTION OF THE PREFERRED EMBODIMENT

Figure 1:
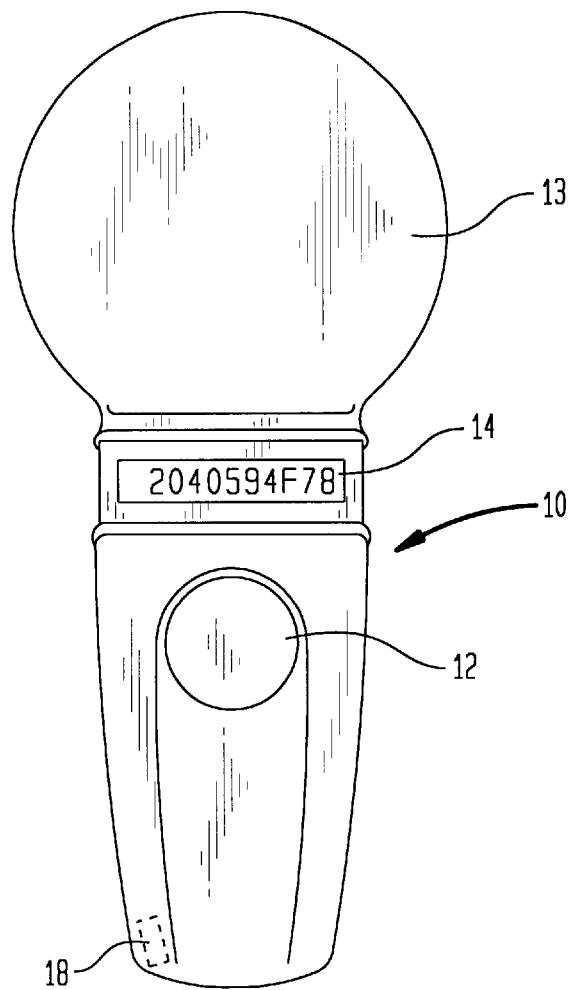
FIG. 1 is a top plan view of a programmable channel search reader constructed in accordance with the invention.

A multichannel reader 10, as shown in FIG. 1, is designed to interrogate passive transponders, including among others, transponders manufactured by Destron, Avid, Trovan, Nedap, Datamars and Texas Instruments to determine and display an identification number stored by each transponder. Transponders today are implanted or otherwise affixed onto a wide variety of animals. However, the veterinarian is unable to read the transponders with a single transceiver, because each manufacturer has designed a different technology, using different (a) methods of modulation, (b) frequencies, and/or (c) methods of encoding with which to output the transponder identification number. Table 1 set forth below discloses a sample of the different manufacturers and the different parameters required by each method:

Three of the examples set forth in Table 1 will be now described below in greater detail.

As is known in the art from U.S. Pat. Nos. 5,041,826 and 5,166,676 to Milheiser, an identification signal may include a preamble and data formed as a string of ones and zeros.

The Destron (FECAVA version) transponders are designed for optimum performance at the frequency $f_0$=125 kHz and send their message using AM-FSK. The duration of a binary state (one bit length) is 100 cycles of $f_0$. A ZERO is represented by 50 cycles of $f_0$10, followed by 50 cycles at $f_0/8$. A ONE is represented by 50 cycles at $f_0/8$ followed by 50 cycles at $f_0/10$. The relevance of the ONES and ZEROS will be discussed in greater detail below. An identification telegram portion of the transponder signal comprises 48 data bits, of which 35 are information bits. The transceiver validates the unique identification code after reception of at least two identical telegrams.

The Datamars transponders are designed for optimum performance at the frequency $f_0$=125 kHz. The transponder sends its message using PSK in the frequency band $f_0/9$. The duration of a binary state is also 100 cycles of $f_0$. The message is Manchester encoded. Each transition in the Manchester encoded signal is represented by a 120° phase shift. The Manchester transition representing a ZERO of the original message consists of a −120° phase shift and that representing a ONE consists of a +120° phase shift. The relevance of the ONES and ZEROS will again be discussed in greater detail below. The identification telegram comprises 62 bits of the following structure: 8 synchronization bits (0000 "1" "0" 0) ("1" and "0" are long bits which are 1.5 times longer than normal bits); 48 information bits, divided into 6 blocks of 8 bits; each block is supplemented with a parity (even) bit at the end. The transceiver validates the unique identification code after reception of at least two identical telegrams.

The Trovan transponders are designed for optimum performance at the frequency $f_0$=128 kHz and send its message using PSK in the frequency band $f_0/2$. The encoding is differential biphase. Under this method, a ONE is represented by a phase shift of 0°, while a ZERO is represented by a phase shift of 180°0. The duration of a binary state is 16 cycles of $f0$. The relevance of the ONES and ZEROS will again be discussed in greater detail below. The transponder identification telegram comprises 64 bits of the following structure: 8 synchronization bits (01111111); 39 information bits; and 17 error detection bits.

As can be seen from above, transponders from a variety of manufacturers utilize a variety of protocols for transmitting information stored in the transponder.

TABLE 1

| TYPE | TX Frequency | Modulation | BIT Encoding | Data Encoding | Bit Rate | Data Encription |
|---|---|---|---|---|---|---|
| Destron FECAVA | 125 kHz | AM | FSK fo/8, fo/10 | Manchester | 2500 BPS | No |
| Avid-USA | 125 kHz | AM | FSK fo/8, fo/10 | NRZ | 2500 BPS | Yes |
| Trovan | 128 kHz | AM | FSK fo/2-Phase | BP | 8 K BPS | No |
| Datamars | 125 kHz | AM | FSK fo/9-Phase | Manchester | 2500 BPS | No |
| FDX-B | 134.2 kHz | AM | PSK | MDBP | 4.4 K BPS | No |
| HDX Half Duplex | 134.2 kHz | None | FSK 124.2 kHz and 134.2 kHz | NRZ | 8.39 K BPS | No |

Figure 2:
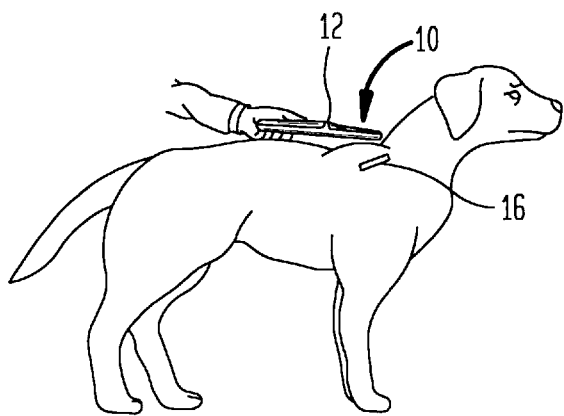
FIG. 2 is a front view of the programmable channel search reader scanning a transponder implanted in a pet in accordance with the invention.

Reference is now made to FIGS. 1 and 2. Reader 10 includes a scanner 13 operated by activating a scan button 12 for reading transponders. Scanner 13 is typically positioned on the side of reader 10 opposite scan button 12. Upon processing the information received through scanner 13, which will be described below in greater detail, the information corresponding to the specific transponder is displayed on a liquid crystal display 14 ("LCD 14"). Reader 10 further includes a field programmable serial port 18, which may be linked to a computer by either hardware, RF or the like to edit or enhance the software of reader 10. This operation will also be described in greater detail with reference to FIG. 5.

Figure 3:
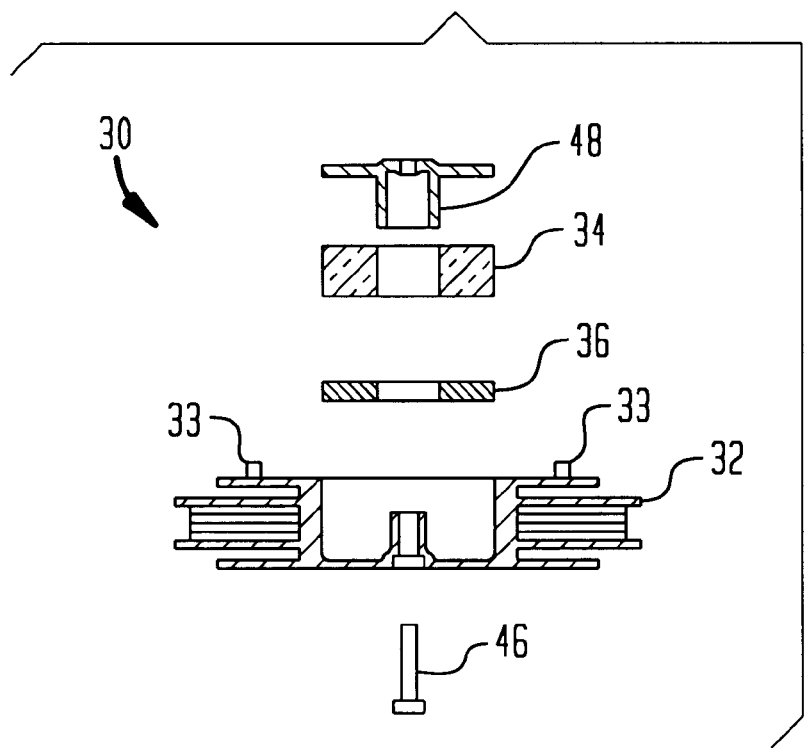
FIG. 3 is an exploded cross-sectional view of the antenna assembly constructed in accordance with the invention.
Figure 4:
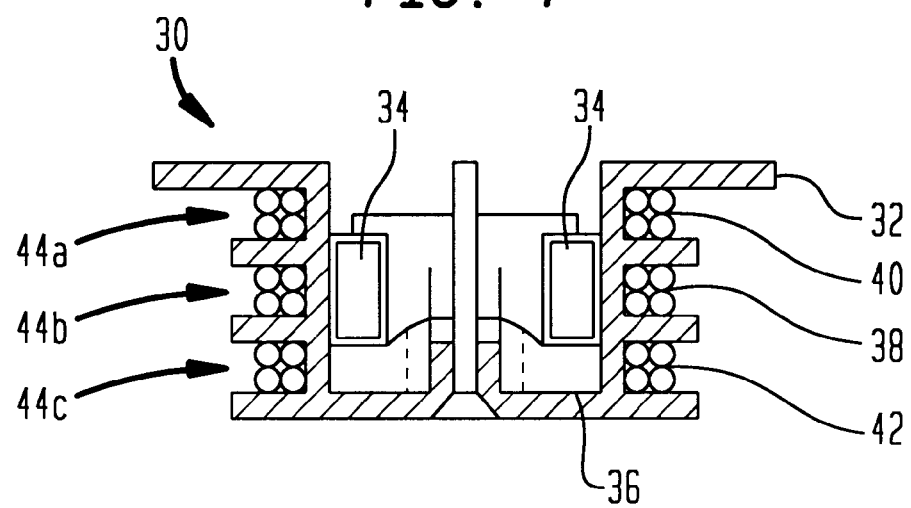
FIG. 4 is a front elevational cross-sectional view of the antenna assembly constructed in accordance with the invention.

As shown in FIGS. 3 and 4, reader 10 consists of separate transmit antenna 38 and receiver antennas 40, 42. Receiver antennas 40, 42 include two sections which are physically separated and connected in a differential mode as will be described below. More specifically, scanner 13 includes a coil assembly 30, disposed in reader 10. As shown in FIG. 3, assembly 30 comprises a bobbin 32, an adjustable ferrite plug 34, foam padding 36, one exciter coil 38 and two receive coils 40 and 42. Bobbin 32 provides three coaxially spaced channels 44a, 44b and 44c for receiving a respective one of exciter coil 38 and receive coils 40 and 42 so that they are fixably wound separate from ferrite plug 34. Receive coils 40 and 42 are positioned on either side of exciter coil 38, are longitudinally spaced from exciter coil 38 and are coaxial with exciter coil 38. Coil assembly 30 is mounted in reader 10 by mounting pins 33. Ferrite plugs 34 and foam padding 36 are held in position in bobbin 32 by means of an antenna core insert 48 which is coupled to screw 46.

Reader 10 interrogates transponder 16, by first driving exciter coil 38 with a signal of fixed frequency, a method well-known and developed in the art (see e.g. U.S. Pat. Nos. 5,012,236, 5,041,826, 5,166,676 and 5,250,944). As a consequence, exciter coil 38 emits an electromagnetic field which complies with and activates transponder 16 and allows transponder to drive the transponder coil with a signal corresponding to the transponder's identification number. As a result, the transponder's coil emits an electromagnetic field which is picked-up by one or both of receive coils 40 and 42, thereby causing a signal to be induced in the receive coil corresponding to the transponder's identification number.

Reception of an intelligible signal by reader 10 is possible because the transponder's electromagnetic field is not common to both receive coils since the transponder will be closer to one of the receive coils. Consequently, different signals are picked-up by the respective recovery coils 40, 42 due to the decay of the transponder's electromagnetic field between the receive coil closest to the transponder and the receive coil farthest away from the transponder.

Due to the proximity of receive coils 40 and 42 to exciter coil 38, the electromagnetic field of the exciter coil 38 induces an equivalent and symmetrical signal in each receive coil 40 and 42. Thus, in the presence of transponder 16, each receive coils 40 and 42 will have induced signals corresponding to the electromagnetic fields emitted by both exciter coil 38 and transponder 16. In other words, the transponder's signal is superimposed on the signal used to drive exciter coil 38.

Because the reader is a two antenna system, with a balanced receiver, the transmitter has a relatively very high Q at resonance, providing the ability to easily generate large H fields to activate the transponders. The separate receive antennas are configured for lower Q or wide band frequency response, tuned to a center frequency midway of the response frequency for all the transponders commonly used in radio frequency identification. The receive antennas have a precise means to balance the antennas to a minimum value, thus providing an effective method to cancel the carrier signal, and therefore the resulting signal at the antenna output is predominantly the modulated signal sent by transponders 16 as will be described below.

Figure 5:
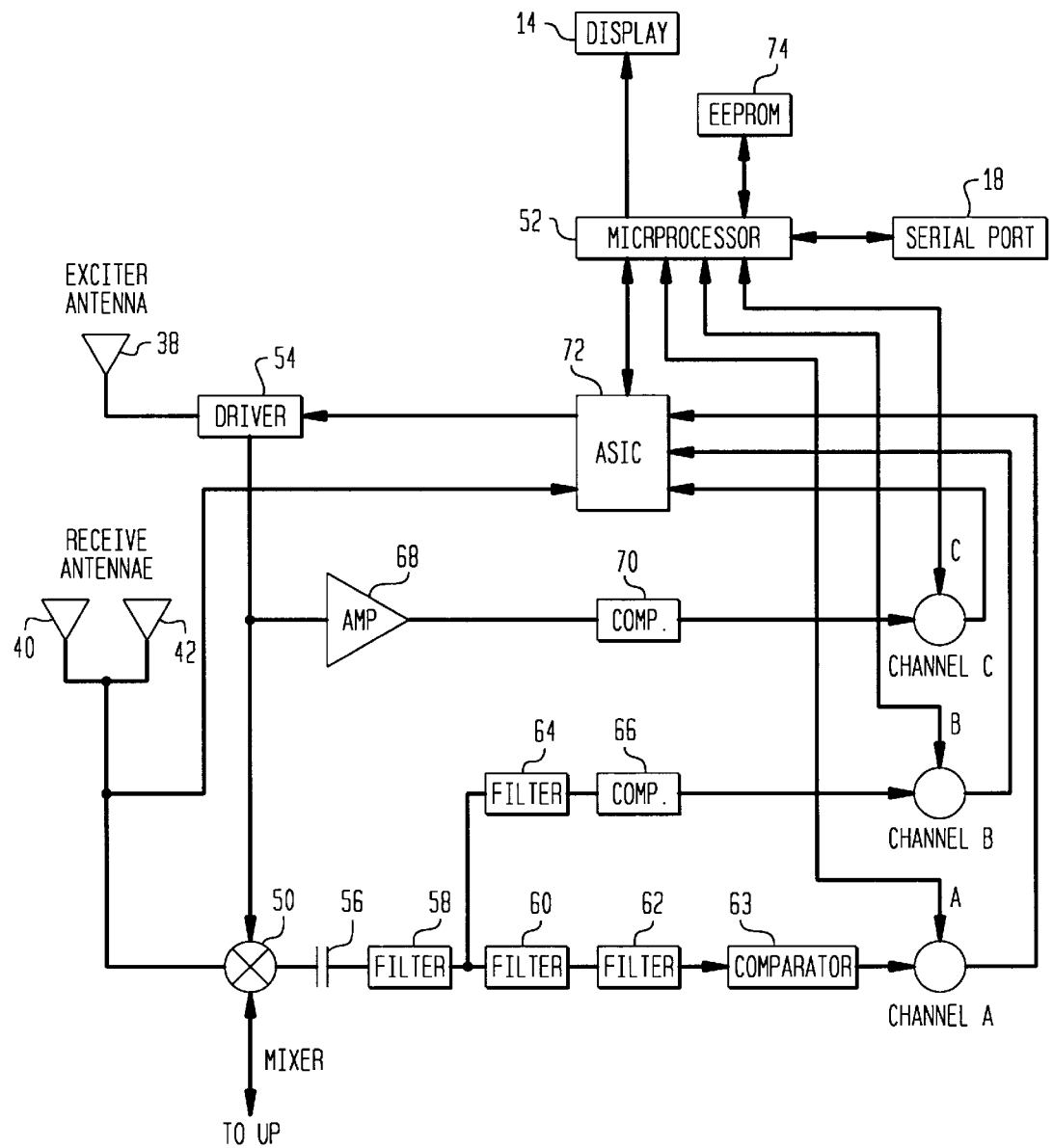
FIG. 5 is a schematic of the circuit for operating the channel search reader constructed in accordance with the invention.

Reference is now made to FIG. 5 for a disclosure of the operation of reader 10. Reader 10 is controlled by a microprocessor 52 which receives an input and provides outputs to an ASIC chip 72. Microprocessor 52 drives a liquid crystal display 14 ("LCD 14"), communicates with a serial port 18 and is in two way communication with an EEPROM 74. ASIC chip 72 provides an output to a driver 54 which drives antenna 38 with the interrogating or exciter signal. ASIC chip 72 also samples the input received at receive antennas 40, 42. A mixer 50 receives the input from receive antennas 40, 42 as well as driver 54 and operates on these signals to provide an output microprocessor 52 as well as to a Channel A output and a Channel B output through a serially coupled capacitor 56 and filter 58.

Channel A includes serially coupled bandpass filters 60, 62 which provide an input into comparator 63. The output of comparator 63 is output to ASIC chip 72 as the Channel A. Similarly, Channel B receives the filter output from filter 58. Channel B includes a filter 64 for filtering the output of filter 58 and providing an input to a comparator 66. Comparator 66 provides the output of Channel B which is input to ASIC chip 72. A Channel C includes an amplifier 60 which receives the input directly from receive antennas 40, 42 and provides an output to comparator 70. Comparator 70 outputs its signal to ASIC chip 72.

The transponder's superimposed signal is received and processed by mixer 50. Because the mixing input frequency is a variable, mixer 50 operates under full control of a microprocessor 52. With this design, mixer 50 may act as a synchronous, non-synchronous or variable phase demodulator as will be described below in greater detail with reference to FIG. 5.

Because microprocessor 52 is controlling the mixing frequency, mixer 50 can be fed at any time with different frequencies, with variable phases and intervals as required to demodulate the different transponder signals (a result of the different transponders described above) present at mixer 50. The variable phase control is very important because in many instances the transponder frequency response is not always in phase with the transmitted frequency which, if mixed this way, would result in a poor demodulation.

In order to recover the transponder's signal, it must be separated or distinguished from the signal of exciter coil 38. To accomplish this task, the signal outputted from driver 54 used to drive exciter coil 38, and in the case of the preferred embodiment, a 125 kHz signal, is "mixed in" with the signals induced in receive coils 40 and 42 by mixer 50. This received signal is inputted into mixer 50. The resulting mix includes three components: (1) the original exciter coil signal created by exciter coil in generating an interrogating electromagnetic field, (2) the receive signal generated by transponder 16, and (3) "the mixed in" exciter coil signal (which is identical to the first component). Because of this mixing, the two exciter signals cancel each other, leaving only a recovery signal corresponding to the transponder signal. The resulting signal is next filtered.

With reference to Table 2, it is known that the yet unidentified transponder's signal will have a frequency component falling in the range of 0.5 kHz to 20 kHz in view of the transponder intended to be interrogated and the proposed ISO standards. This information is based on the signal used to drive the exciter coil having a frequency of 125 kHz. In order to exclude signals falling outside this range, reader 10 selects the desired bandwidth by means of different filters used in the channels.

Table 2 set forth below discloses a sample of the different frequency ranges of certain transponders in the marketplace:

TABLE 2

| Frequency of Transponder Signal | Manufacturer of Transponder |
| --- | --- |
| 124.2–134.3 kHz | HDX |
| 0.558–3.90635 kHz | Trovan |
| 1.563–7.825 kHz | NeDap |
| 12.5/15.6 kHz | Avid |
| 12.5/15/6 kHz | Destron |

The HDX transponder sends a signal which is half duplex. As a consequence, the signal is not mixed and, is processed along a different path as will be described below.

From mixer 50, the transponder signal is next split into two paths. The first path (Channel A) is optimized for FDXA signal recovery and the second path (Channel B) is optimized for FDXB signal recovery. The first path isolates the Avid and Destron transponder signals, for example, by passing the signal through a band pass filter which cuts off signal components having a frequency falling outside the range of 12 to 15.625 kHz. The second path isolates the remaining transponder signals by passing the signal through a low pass filter which cuts-off signal components having a frequency above 10 kHz.

More specifically, the frequency content for identification purposes of the signal outputted from mixer 50 for all transponders is under 20 kHz. To process these signals, the outputted signal from mixer 50 passes through capacitor 56 to filter 58. Filter 58 is a low pass filter which limits the frequency content to 20 kHz. The output of filter 58 then is fed to two separate filter channels A and B. Channel A suppresses the carrier passing signals only between frequencies of 12 to 16 kHz first by means of a 12 kHz band pass filter 60 and then by means of a 16 kHz band pass filter 62 and ultimately to a comparator 63. This frequency spectrum covers transponders for Destron, Avid and Datamars, for example. In Channel B, the same signal passes through a second low pass filter 64 up to 10 kHz to a comparator 66. Channel B will recover data for transponders in this frequency range, such as Trovan and FDX-B (NEDAP).

The HDX type of transponder works differently compared to all other transponders 16 described. An HDX transponder 16 first stores power transmitted by reader 10 and when reader 10 pauses in transmitting, the HDX transponder 16 sends its data Due to this type of operation of the transponder, the signal is not modulated. The binary bits are FSK (frequency shift keying) encoded only, with 124.2 kHz and 134.2 kHz. Reader 10 processes the HDX signal without the need of mixer 50 as no demodulation is required The receive antenna is coupled to an amplifier 68 of Channel C and then fed to comparator 70. The comparator converts the signal from a sine wave to a square wave and feeds the signal to microprocessor 52 through ASIC 72 when selected. The microprocessor measures the frequency period to determine if the input is either a 124.2 KH or a 134.2 KH.

Channels A, B and C each pass its respective signal through comparator 63, 66 and 70, respectively which reduces the noise associated with this signal. Each comparator 63, 66, 70 measures the signal's amplitude continuously and compares its hystherisis to a reference voltage of 0.1 volts. If the signal's amplitude is greater than 0.1 volts, the comparator's output is 3 volts. If the signal's amplitude is less than 0.1 volts, the comparator's output is 0 volts. The effect of passing the signal through the comparator is to square-off the signal. Consequently, the rising edges of the signal can be better detected, thus allowing the frequency component of the signal to be accurately measured.

The frequency discriminator, which forms a part of ASIC 72, determines the frequency of the signal at each channel input by measuring one cycle of the squared-off signal using the ASIC's magnitude comparators. Based on this measurement, the frequency and the transponder's manufacturer can be identified using a microprocessor containing the information set forth in Table 2 which will be described below in greater detail. Dependent on the identity of the transponder the signal is then operated upon by software to convert the transponder signal into an identification number to display the tag identification data. After the bits are decoded, microprocessor 52 will then store the ponder telegram and transmit a part of the telegram portion of the transponder signal to LCD 14 to be displayed for the user.

Figure 6:
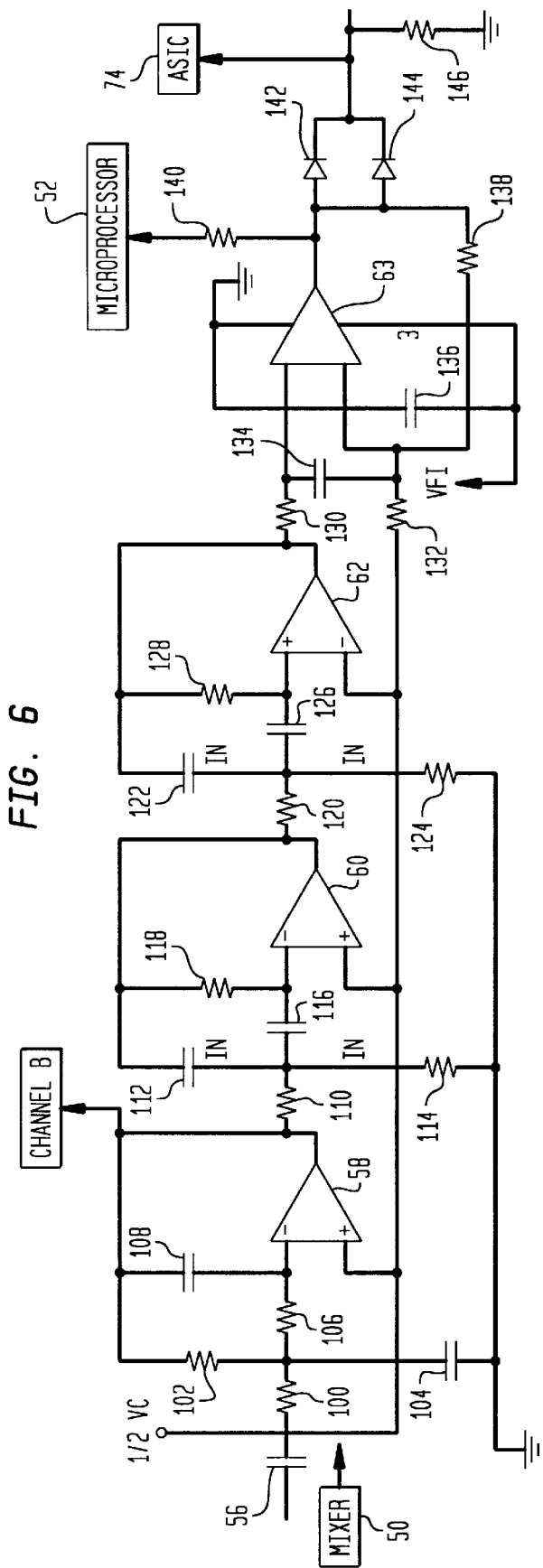
FIG. 6 is a circuit diagram for channel A constructed in accordance with the invention.

A preferred embodiment of the circuit for Channel A will now be described with reference to FIG. 6. Mixer 50 is connected in series to a capacitor 56 which is connected in series to a resistor 100. Resistor 100 is coupled to a resistor 102. Resistor 102 is in parallel with a capacitor 108 and a resistor 106. The parallel combination is connected to ground through a capacitor 104 and coupled to the input of filter 58. The other input of filter 58 is connected to one-half of the control voltage. The output of filter 58 is connected in series to a resistor 110 and to the above mentioned parallel combination. Resistor 110 is connected to a parallel combination of a capacitor 112 in parallel with a resistor 118 and a capacitor 116. Resistor 110 is further connected to ground through a resistor 114. The parallel combination is connected to the input of filter 60. The other input of filer 60 is connected to one half of the control voltage. The output of filter 60 is connected in series to resistor 120 and the parallel combination of capacitor 112, resistor 118 and capacitor 116.

Resistor 120 is coupled to the parallel combination of a capacitor 122 in parallel with a resistor 128 and capacitor 126. Resistor 120 is also connected to ground through resistor 124. The parallel circuit of capacitor 122 with resistor 128 and capacitor 126 is coupled to the input of filter 62. The other input of filter 62 is coupled to one-half of the control voltage. The output of filter 62 is coupled in series to a resistor 130 and the parallel combination of capacitor 122, resistor 128 and capacitor 126. Resistor 130 is coupled to a capacitor 134 which is connected to a resistor 132 connected to the control voltage. Resistor 130 is also coupled to the input of comparator 63. The other input of comparator 63 is connected to resistor 132 and capacitor 134. Comparator 63 is directly coupled directly to a voltage source and to the same voltage source through capacitor 136. Resistor 132 is further coupled in series to a resistor 138. The output of comparator 63 is coupled to microprocessor 52 through a resistor 140 and to a parallel combination diodes 142 and 144. Diodes 142 and 144 are connected to microprocessor 52 through ASIC 72 and to ground through a resistor 146.

Figure 7:
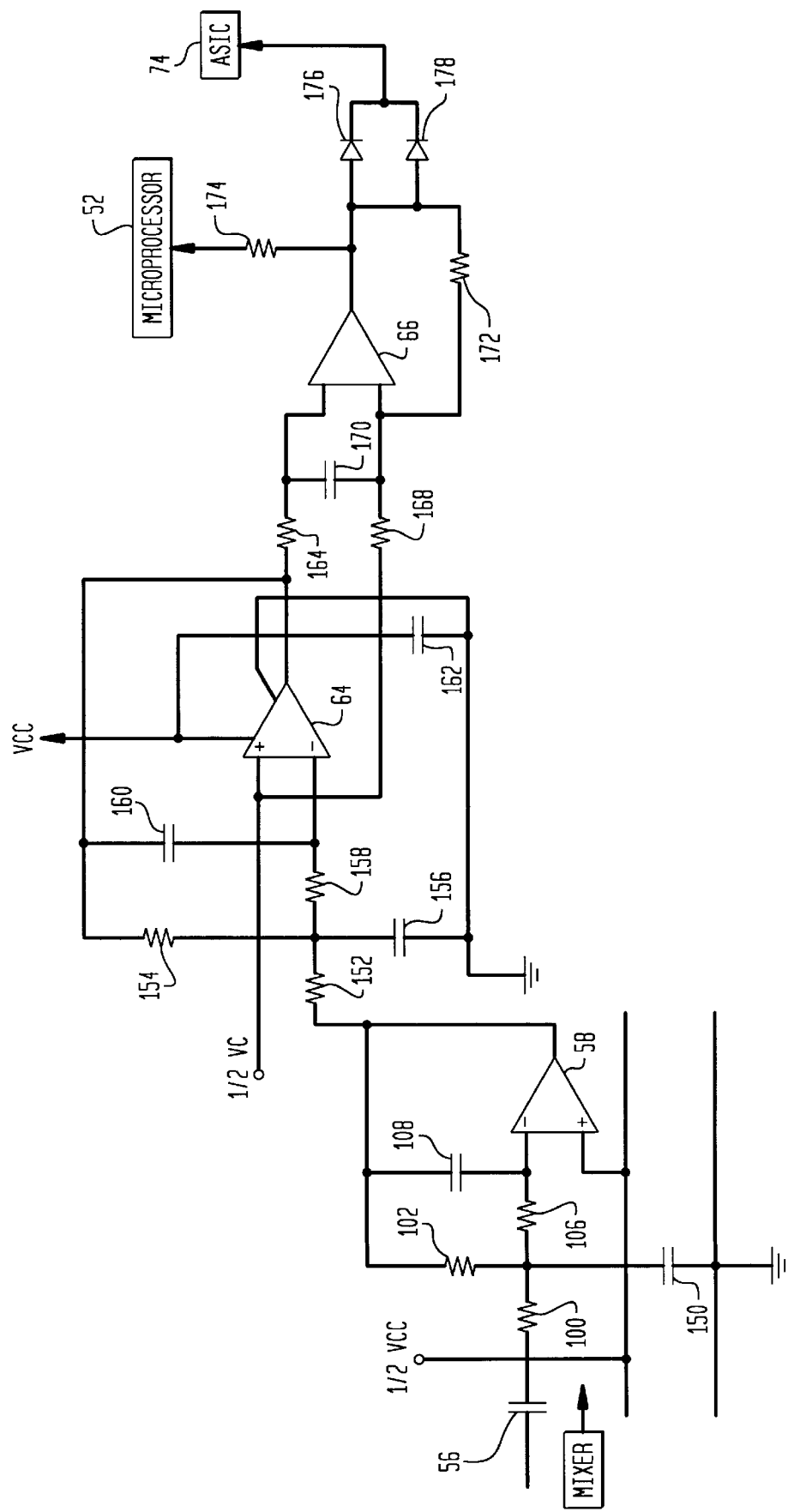
FIG. 7 is a circuit diagram for channel B constructed in accordance with the invention.

A preferred embodiment of the circuit for Channel B will now be described with reference to FIG. 7. As set forth above with respect to the circuit for channel A, mixer 50 is connected in series to capacitor 56, which is connected in series to resistor 100. Resistor 100 is then coupled to the parallel combination of resistor 102 in parallel with capacitor 108 and resistor 106. This parallel combination is connected to an input of filter 58. Resistor 100 is coupled to ground through capacitor 150. The other input of filter 58 is connected to one-half of the control voltage. The output of filter 58 is connected in series to a resistor 152 and to the above mentioned parallel combination. Resistor 152 is coupled to a parallel arrangement of resistor 154 in parallel with a capacitor 160 and a resistor 158. This parallel arrangement is connected to an input of filter 64. Resistor 152 is also coupled to ground through a capacitor 156. The other input of filter 64 is connected to a control voltage.

Filter 64 is further coupled to a second control voltage $V_{cc}$, which is connected to ground through a capacitor 162. Filter 64 is further connected in series to a resistor 164 and the parallel combination of resistor 154, capacitor 160 and resistor 158. Resistor 168 is coupled to the control voltage. A capacitor 170 is positioned between resistors 164 and 168. Resistor 164 is coupled to the input of comparator 66 and resistor 168 is coupled to an input of comparator 66. The output of comparator 66 is coupled to microprocessor 52 through a resistor 174 and to a parallel pair of diodes 176 and 178. Resistor 168 is also coupled to the parallel pair of diodes 176 and 178 through resistor 172. The output of diode 176 and 178 is coupled to ASIC 72.

Figure 8:
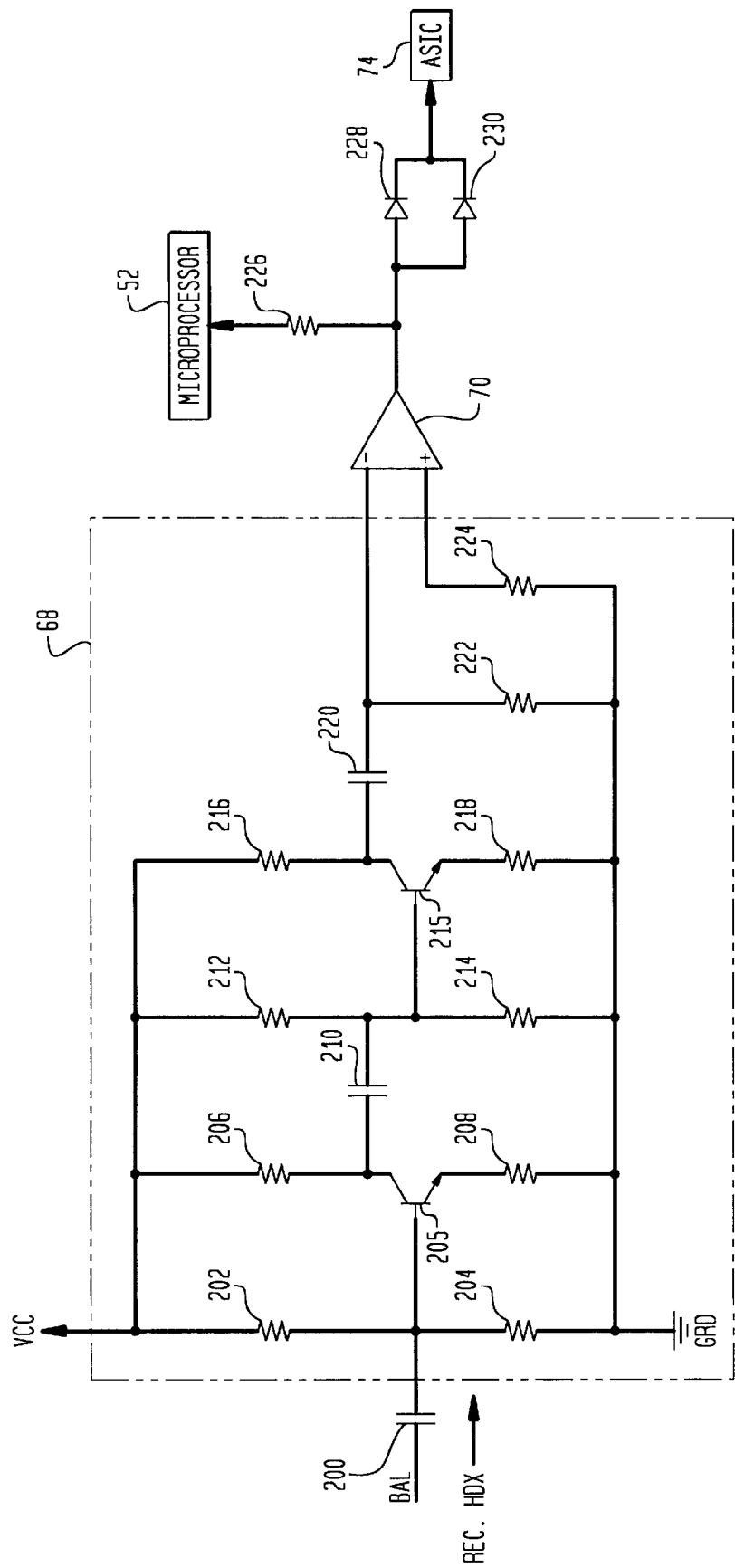
FIG. 8 is a circuit diagram for channel C constructed in accordance with the invention.

The preferred embodiment for Channel C will now be described with reference to FIG. 8. A capacitor 200 is connected to receive antennas 40 and 42. Capacitor 200 is coupled to the base of a transistor 205. Capacitor 200 is also connected to a control voltage through resistor 202. Resistor 200 is coupled to a resistor 206 to the collector of transistor 205. Capacitor 200 is further connected to ground through a resistor 204, which is connected in parallel to resistor 208, a resistor 214, a resistor 218 and a resistor 222. The emitter of transistor 205 is coupled to ground through resistor 208 through ground. Resistor 206 is coupled to the base of a transistor 215 through a capacitor 210. Resistor 206 is coupled in parallel to the combination of capacitor 210 and resistor 212. Resistor 212 through a resistor 216 is connected to the collector of transistor 215. The emitter of transistor 215 is connected to ground through resistor 218. Resistor 216 is coupled in series with a capacitor 220 and resistor 222 to ground. Capacitor 220 is connected to the input of comparator 70. The other input of comparator 70 is coupled through a resistor 224 to ground. The output of comparator 70 is connected to microprocessor 52 through a resistor 226. The output of comparator 70 is further coupled to a parallel pair of diodes 228 and 230. The parallel combination of diodes 228 and 230 is further coupled to ASIC 72.

To activate reader 10 during use, scan button 12 is pressed down once and released. Reader 10 will (1) display the version of software operating reader 10 on LCD 14; (2) display remaining battery life on LCD 14; and (3) indicate its ready state on LCD 14. Scan button 12 is then pushed and held down a second time to scan the animal as shown in FIG. 2. Reader 10 is held essentially flat over a transponder 16 implanted in the animal and then moved slowly in a circular direction over transponder 16. When an ID is located, a noise (e.g. a beep) will be outputted by reader 10 followed by the code display on LCD 14 indicating the information stored in transponder 16.

To operate reader 10, scan button 12 is pressed for activating driver 54 (scan mode). Exciter antenna 38 receives the signal. At the same time, the signal from driver 54 is fed to mixer 50 for processing. When reader 10 is in "scan mode," microprocessor 52 automatically starts testing for the presence of transponders. The testing is performed by systematically computing the signal frequency for each type of transponder, this testing occurs over only a few cycles of the wave. If the signal tested is within the response characteristics of any of the transponders, microprocessor 52 will remain in that scan mode until the necessary data length is collected to complete at least 2 to 3 error free telegrams of the transponder.

More specifically, scan button 12 is pressed for driving driver 54 to provide inputs to exciter antenna 38 and mixer 50. Depending on how the software in microprocessor 52 has set the control lines to the various filters, if a transponder 16 is present and the signal received by receive antennas 40, 42 is of sufficient strength, the signal from transponder 16 enters mixer 50 and passes through the band pass filter arrangement of Channel A, the low pass filter arrangement of Channel B and the arrangement of Channel C. Based on the response characteristics discussed above, the activated channel will then process the received signal, while the non-selected channel will effectively ignore the signal. As previously described, the signals fall into three basic categories: FDXA, FDXB and HDX. HDX, as described above, is modulated differently and therefore treated differently as processed by Channel C. However, the majority of the other transponders in the marketplace, fall into the category of FDXA or FDXB. The operation of reader 10 for FDXA and FDXB will be described below.

When the FDXB read mode is entered, low pass Channel B is selected, the software will search the data port of microprocessor 52 (via ASIC chip 72 by Genesis Ltd.). When the software program finds a pulse that fits within the valid timing for a FDXB signal, microprocessor 52 will convert the phase value of the signal into a bit value. If a normal non-phase changing cycle is found per ISO 11785 standards (16 to 24 cycles leading signal period followed by a trailing cycle of 8 to 16 exciter cycles that has an inverted logic level from the leading signal period), then the bit value for that signal period is set to logic 0. If the non phase changing bit period timing is outside of the expected time, the program will drop out and continue the search for a relevant signal.

The software of microprocessor 52 will store the bit information in a bit stream up to a length of 48 bytes. The software will then search for a header. A header is a unique sequence of binary numbers which cannot be found in a data message. The header indicates the start of the telegram and distinguishes the type of transponder (especially if two transponders use the same technology for data transmission). After searching and finding the header, the software will perform a string compare to check the integrity of the telegram. Thereafter, the software will verify the data integrity by performing a data format design. After this function, the relevant data is removed and placed in a bit stream for display on LCD 14 of reader 10 and sent to serial part 18, if so programmed, for external data logging and storage.

When the processor enters the FDXA reading process, band pass filter channel A is selected, the signal is then fed to a digital phase lock loop type of discriminator implemented in ASIC chip 72. ASIC chip 72 will then set the data line to the processor to a logic "0" signal if the FDXA signal falls under the MID frequency of 14 KHZ. If the signal is above 14 KHZ, the ASIC will set the data line to the processor to a logic "1".

The application software in microprocessor 52 will then test the line by looking for the logic level transitions. If a low to high occurs within the allowed time period for a FDXA signal bit period, the program will store a logic "1" in a bit stream. If a high to low transition occurs within the expected bit period (with a predetermined minimum-to-maximum tolerance) the software will store a logic low in the bit stream. If the expected minimum-to-maximum period times are met, the process continues until a full 48 byte bit stream is filled, if not, then the program will continue its search.

As described above the software of microprocessor 52 will detect the type of header and store this information for the appropriate data process. This data stream is parsed out into three strings of data as a function of where it was found in the header. The software will then compare these three strings setting any instance of two like compares, as the correct logic level or the bit position where it was found in the data frame. The data of the resulting frame is then processed based on the type of header that was found. The resulting tag data is then displayed on LCD 14 display. The user may select to have the data sent out of serial port 18 by using the reprogramming function.

It is noted that the above embodiment is described in connection with the commonly known and used transponder format and protocols. However, the concept of a mixer operated under microprocessor control to accommodate hardware to receive and process transponder signals term is not limited to these known protocols and formats but as can be readily ascertained which is a adaptable to new protocols and formats as they are developed. To further solve that problem, the present reader is capable of being reprogrammed on site by reprogramming the operating instructions for the microprocessor which are stored in the EEPROM 74 which will be described in further greater detail below.

The need for easy programming of the reader by any computer is an important feature required for readers used worldwide, especially in this time of evolving markets with new technologies and the ISO approval of the RFID standard. As set forth above, the unique advantage of reader 10 is its ability to read a plurality of protocols which reader 10 is pre-programed to decode. By a simple change of the program, reader 10 may be reconfigured from a multi-protocol to a single channel or other formats, providing the benefits of faster speed of reading and provide features as required by the users.

Reader 10 is programmable by the inclusion of a re-programmable EEPROM memory 74 coupled to microprocessor 52. EEPROM memory 74 may be programmed by any external computer or specialized digital equipment that communicates with reader's 10 internal microprocessor 52 through serial programing port 18 as described below with reference to FIG. 9. Programming is done by a boot load function that resides in processor 52 on-chip mask programmable ROM.

On power up, control hardware of reader 10 switches processor 52 into the microcontroller mode of operation at a Step 7. In this mode, the boot program controls reader 10. The boot function (in the mask programmed ROM) initializes processor's 52 control registers at a Step 7 and if it detects that recent shut down occurred, the boot program will continue by sending the ASCII symbol "ENQ" out of the serial programming port at a Step 3. If a second start after power down is not detected, it will drop out of the boot function and switch directly to the application (transponder reading) program.

When the boot program detects a second start after a recent power down, it will send a "ENQ" character to the external programming device, looking for a repeating carriage return (CR symbol in ASCII) at a Step 4, if a "CR" symbol is not seen, the boot function defaults to the application program stored on EEPROM 74 located on the reader's PC board. If a CR symbol is found, the reader stays locked into the boot program at a Step 5. The external programming device must send the control character "0" at a Step 6, indicating that a Motorola S record format containing a number representing the object codes starting memory location is to be placed in its starting address reference table, that will be used to store the program object code to be burned into reprogrammable EEPROM 74.

The programming process begins when the operator presses scan button 12, the operator then observes LCD 14 until the word "READY" disappears, the operator must then press button 12 a second time, causing the boot program to continue into the boot program. As the system begins its wake-up process, a combination of both hardware and software controlled time-delayed processing proceeds, causing the processors mode of operation hardware to latch a microprocessor state control line at a Step 7. This hardware signal will allow the processor to switch the microprocessor mode under control of the boot program (in the microprocessor mode, the processor runs from EEPROM 74).

When the boot program begins running, it causes the processor to send out the ASCII symbol "ENQ" at a Step 8. When the external programming device finds an ENQ symbol on the serial line at a Step 9, it begins sending the ASCII symbol for carriage return ("CR") repeatedly at a Step 10. If a CR symbol is not seen at any time that the boot elects to look at the receive line, reader 10 breaks its lock and switches into the application program by dropping its own reset line and causing a reset to the base address of the re-programmable EEPROM 74. If a CR is found on the serial line (by the reader's boot program), the boot microprocessor will continue to operate in the boot program. The external device connected to serial programming port 18 must then send the character "0" in ASCII format at a Step 11.

When the boot program finds the character "0", it will then take the next "S" record formatted data that it finds on the serial port, and store the numeric data in a vector table to be used to store the object code that is to be installed at a Step 12. At Step 12, reader 10 will then send a ACK symbol indicating that it is ready to accept a bum file in Motorola "S" record format. The reader then expects a full and complete Motorola "S" record file to be sent. The user then must place a hardware jumper pin in a programming enable pin socket, to allow for EEPROM memory programming. The next data that the reader is sent will be processed by a burn file, storing the object code portion of this "S" record line, in the first address location that was sent as the offset address process (just described in the last step).

The boot program then compares the code found in the EEPROM memory (just programmed in) against the code that was sent by the external device at a Step 13, if the code agrees reader 10 will send a ACK signal at a Step 14, this is used to indicate that the memory being programmed has taken the code and that it is in sync with the PC. This process continues until the termination record in the S file has been detected by the reader (per Motorola "S" record standards). When the reader boot program no longer detects a "CR" symbol on the serial port, the boot program will break lock and drops into the microprocessor mode (model #1, 64 kk memory size) with the operational software now residing in external EEPROM memory 74 used to run the program.

Reprogramming is used to allow the user to select only specific types of RFID tags to be read, repetitive versus none repetitive modes, special scan modes, improved scan time modes, upgrade features, change the language of LCD 14 or the like.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illusive and not in a limiting sense.

It is also to be understood that the following claims are intended to cover all of the generic and specific features of the invention herein described an all statements of the scope of the invention which, as a matter of language, might be said to fall therebetween.

What is claimed is:

1. An interrogator for use with a plurality of identification transponders, the interrogator producing an interrogation signal for interrogating one of the plurality of transponders, the plurality of transponders using different frequencies and different methods of modulation and encoding to transmit an identification signal in response to the interrogation signal, each of the plurality of transponders being adapted to attach to an article to be identified, said identification signal including at least an identification component, said interrogator comprising:

an antenna assembly for transmitting said interrogation signal from the interrogator to one of the plurality of transponders and for receiving said identification signal from said transponder;

a processor for processing said identification signal received by said antenna assembly and creating an output signal substantially corresponding to said identification component of said identification signal; and a display for displaying said output signal.

2. The interrogator of claim 1, wherein said processing means processes identification signals from at least two different identification transponders.

3. The interrogator of claim 1, wherein said processor includes a mixer for demodulating the identification signal from said transponder to form a demodulated signal.

4. The interrogator of claim 3, wherein said interrogator includes at least a first processing channel and a second processing channel, said mixer transmitting said demodulated signal to at least said first processing channel and said second processing channel.

5. The interrogator of claim 4, wherein each of said processing channels includes a filter and a comparator.

6. The interrogator of claim 5, wherein said first processing channel processes demodulated signals in a range of about 10 to 16 kHz and said second processing channel processes demodulated signals less than about 10 kHz.

7. The interrogator of claim 4, wherein said processing means includes a third processing channel for processing an unmodulated identification signal from said transponder.

8. The interrogator of claim 7, wherein said third processing channel includes an amplifier and a comparator.

9. The interrogator of claim 8, wherein said unmodulated identification signal is a frequency-shift-keyed identification signal.

10. The interrogator of claim 7, wherein said first, second and third processing channels transmit the identification signal through a microprocessor to convert the identification portion thereof for display on said display.

11. The interrogator of claim 1, wherein said antenna assembly includes an exciter antenna and a receive antenna.

12. A method for interrogating one of a plurality of identification transponders that use different frequencies and different methods of modulation, each of said plurality of transponders being adapted to attach to an article to be identified and each of said plurality of transponders including a transponder antenna assembly for receiving an interrogation signal from an interrogator and for responding to said received interrogation signal with an identification signal, said responsive signal including at least an identification component, comprising the steps of:

transmitting an interrogation signal from an interrogator antenna assembly of the interrogator to said transponder;

receiving by said interrogator antenna assembly said identification signal from said transponder, said identification signal exhibiting at least one of a plurality of modulations, encodings, frequencies, phases and intervals and;

processing said responsive signal received by said interrogator antenna means;

creating an output signal substantially corresponding to said identification component of said responsive signal; and displaying said output signal on a display of said interrogator.

13. The method of claim 12, further including the step of demodulating the responsive signal of from said plurality of transponders to form a demodulated signal.

14. The method of claim 13, further including the step of transmitting said demodulated signal to at least a first channel and a second channel.

15. The method of claim 14, further including the step of processing an unmodulated identification signal from said transponder in a third channel.

16. The method of claim 15, further including the step of transmitting the identification signal from said first, second and third channels to a microprocessor for conversion of the identification component thereof for display by said interrogator.

17. A programmable interrogator for use with a plurality of transponders attached to an article to be identified, the interrogator for transmitting an interrogation signal for interrogating one of the plurality of transponders that respond to an interrogation signal by transmitting an identification signal having different frequencies, different methods of modulation, and at least an identification component, said one of the plurality of transponders receiving said interrogation signal from the interrogator and responding to said received interrogation signal with an identification signal, said interrogator comprising:

an antenna assembly for transmitting the interrogation signal from the interrogator to said transponder and for receiving said identification signal from said transponder;

a processor for processing said identification signal received by said transponder antenna assembly and creating an output signal substantially corresponding to said identification component of said identification signal; and a programmer connected to said processor for programming the specific types of identification signals of the different transponders to process.

18. The programmable interrogator of claim 17, wherein said programmer includes an EEPROM coupled to a microprocessor, said EEPROM being programmed by an external computer.

19. The programmable interrogator of claim 18, wherein said processor includes a mixer for demodulating the identification signal, when said identification signal is formed of at least one of different frequencies, variable phases and intervals, to form a demodulated signal, said mixer transmitting said demodulated signal to at least a first channel and a second channel.

20. The programmable interrogator of claim 19, wherein said processor includes at least a third channel for processing unmodulated identification signals.

21. The programmable interrogator of claim 20, wherein said programmer programs said processor to read any combination of at least said first, second and third channels.

* * * * *